INVENTORS.
KEN A. HUELSMAN,
JOE E. DEAVENPORT,
BY E.L. Oberheim
AGENT.

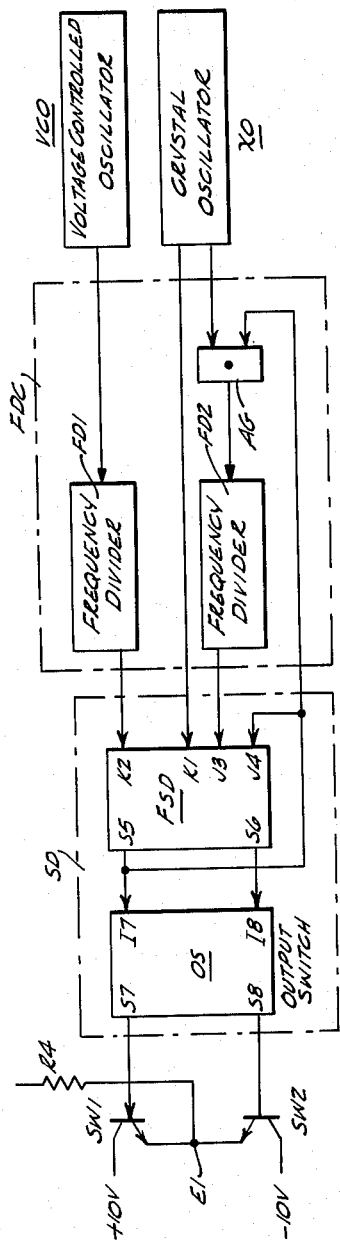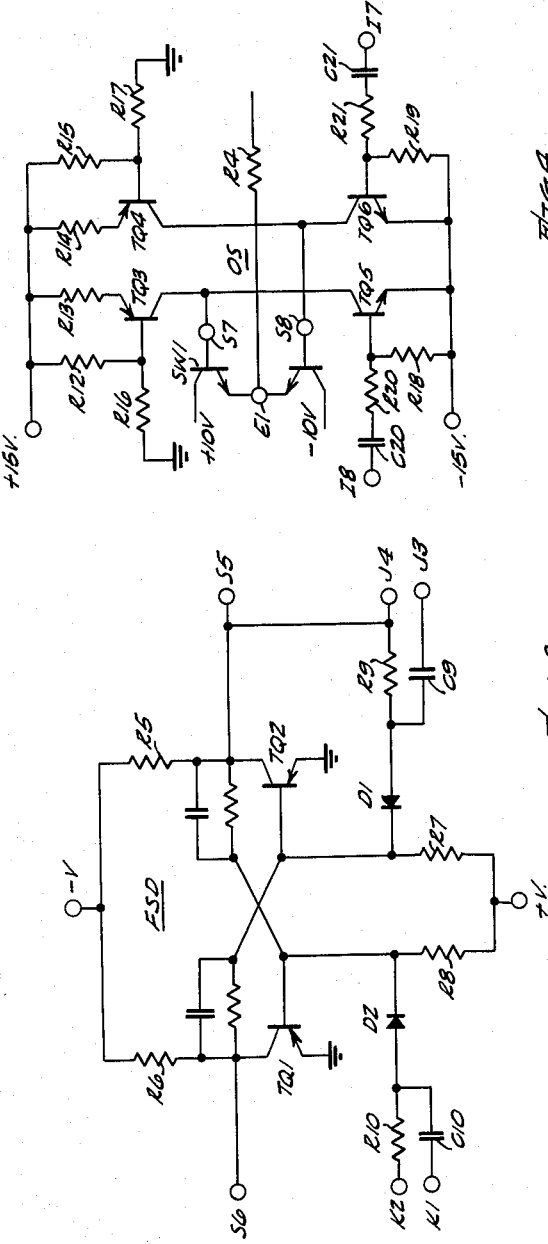

United States Patent Office 3,260,943
Patented July 12, 1966

3,260,943
CONVERTER
Ken A. Huelsman, Oceanside, and Joe E. Deavenport,
San Diego, Calif., assignors to Hughes Aircraft Company, Culver City, Calif., a corporation of Delaware
Filed Mar. 30, 1964, Ser. No. 355,608
9 Claims. (Cl. 328—69)

This invention relates generally to electrical converters, and more particularly to voltage to frequency and voltage to time converters.

In certain of its aspects this invention is related to a copending application of Joe E. Deavenport and Don W. Sexton, Serial No. 270,336, filed April 3, 1963, entitled, Converters, and assigned to the assignee of this invention.

Voltage to frequency converters broadly comprise a circuit means capable of receiving an input voltage, such as a direct current voltage, and converting such input voltage to a time varying voltage having a frequency proportional to, or inversely proportional to, the magnitude of the input voltage.

Voltage to time converters are broadly similar to voltage to frequency converters as characterized above, the output in the latter converters being the reciprocal frequency $1/f$, where $f$ represents output frequency, and denoting time.

Circuits of this general nature have usually employed capacitors as part of the converter circuit, or in control loops forming part of control circuits for controlling the converter circuit. Although such circuits have been found satisfactory for many applications, particularly where high grade, stable capacitors are employed, small changes in capacitor characteristics during operation, even in carefully controlled environments, will introduce conversion errors, sometimes obviating high accuracy conversion.

One object of this invention is to provide an improved electrical converter circuit which is simple and accurate.

Another object of this invention is to provide an improved electrical converter circuit which is relatively insensitive to changing electrical characteristics of its components.

A further object of this invention is to provide an improved electrical converter capable of high speed conversion.

The aforesaid and other objects and advantages are accomplished according to the present invention in a converter system including a converter circuit means for receiving an input voltage and producing an output signal which has a predetermined relationship to the input voltage, in which the converter circuit means is regulated in dependence upon the differential of the input voltage, or a voltage proportional thereto, and a feedback or control voltage, the average magnitude and polarity of the latter of which is dependent upon the electrical output of the converter circuit means.

An arrangement of this type may comprise a converter circuit means having input circuit means, correction signal input circuit means and output circuit means, the converter circuit means being adapted to receive an input signal and produce an electrical output signal having a predetermined relationship to the input signal or voltage. Regulation of this converter circuit means to achieve high accuracy in the conversion operation is provided by a correction signal which is produced by a correction circuit or a control circuit having a signal summing input circuit coupled to and controlled by the input signal circuit means and a controllable feedback circuit, and having an output circuit coupled to and controlling the correction signal input circuit means of the converter circuit means. The feedback circuit is coupled to and controlled by the output circuit means of the converter circuit means. The input signal and the correction signal are summed in the converter circuit means to correct the converted electrical output signal.

According to one practical embodiment of this invention the converter circuit means comprises a conventional voltage controlled oscillator having an input circuit supplied by a potentiometric amplifier means having as its input a particular input voltage which is to be converted to an output frequency. The voltage controlled oscillator also has a correction signal input circuit and an output circuit. In order to handle input voltages of opposite polarity such an arrangement may have a predetermined output frequency for zero input voltage so that the application of a positive going voltage to the input of the potentiometric amplifier means may result in a decrease (or an increase) of the output frequency of the voltage controlled oscillator and the application of a negative input voltage to the potentiometric amplifier means may result in an increase (or a decrease) in the output of the oscillator from the predetermined or center frequency resulting from zero input voltage.

The control or correction circuit comprises a control amplifier having an input circuit coupled to the output terminal of a summing network having a first input circuit coupled to and energized by the electrical output of the potentiometric amplifier means and having a second input circuit coupled to and energized by the electrical output of a feedback voltage network under the control of the electrical output of the voltage controlled oscillator. The control amplifier is provided with an output circuit coupled to the correction signal input circuit of the voltage controlled oscillator. Filtering of the electrical output of the control amplifier may be provided if needed.

The feedback voltage network includes a switching circuit controlled by the electrical output of the voltage controlled oscillator and by the output of a fixed frequency oscillator to alternately switch positive and negative reference voltages in the second input circuit of the summing network under the control of the electrical outputs of the two oscillators in suitably timed relationship to provide the required average D.C. correction voltage.

The aforesaid and other objects and advantages will be better understood by reference to the following specification when considered in conjunction with the accompanying drawings in which:

FIG. 2 is a block diagram illustrating in greater detail the feedback portion of the control circuits illustrated in FIG. 1;

Figure 5:
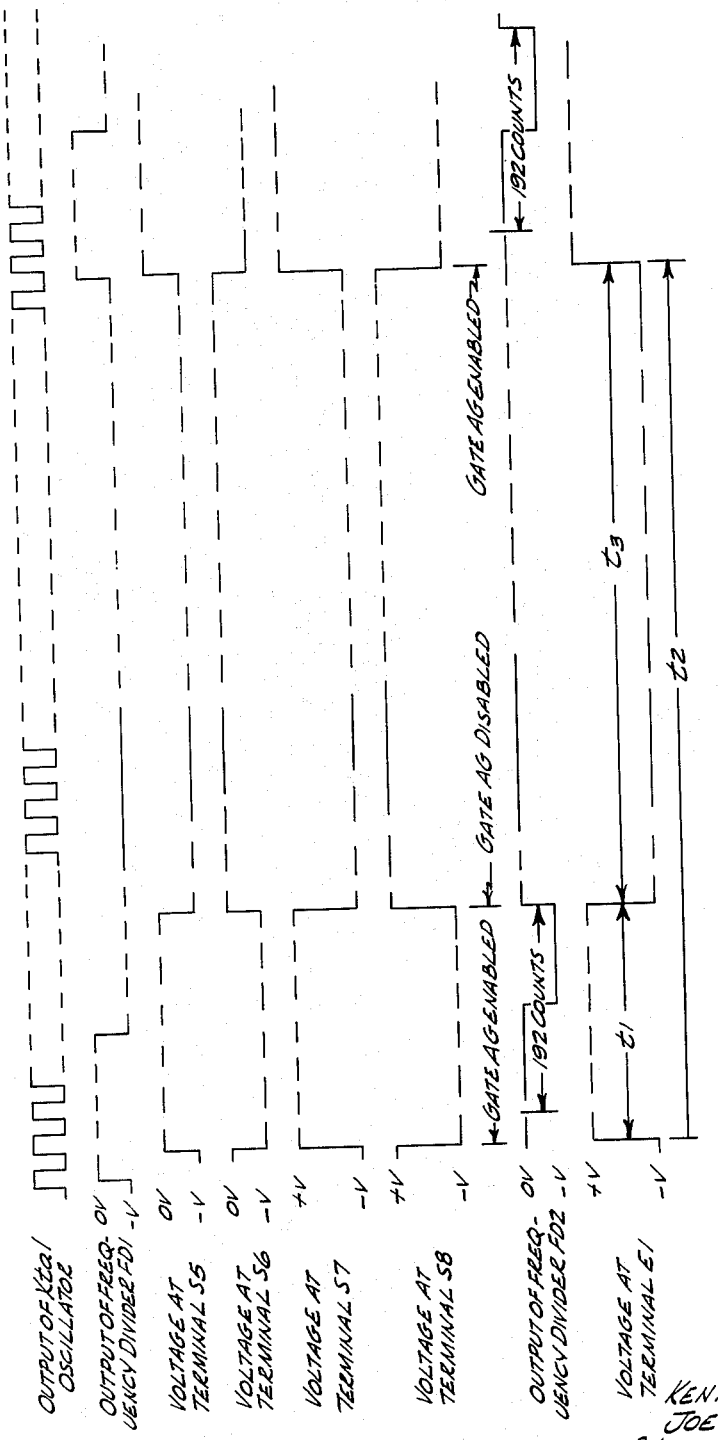

FIGS. 3 and 4 respectively illustrate suitable forms of mechanization of the flip-flop switch drive circuit FSD and the output switch of FIG. 2; and FIG. 5 is a timing diagram illustrating the operational relationships of certain of the components of the circuit arrangement herein.

Figure 1:
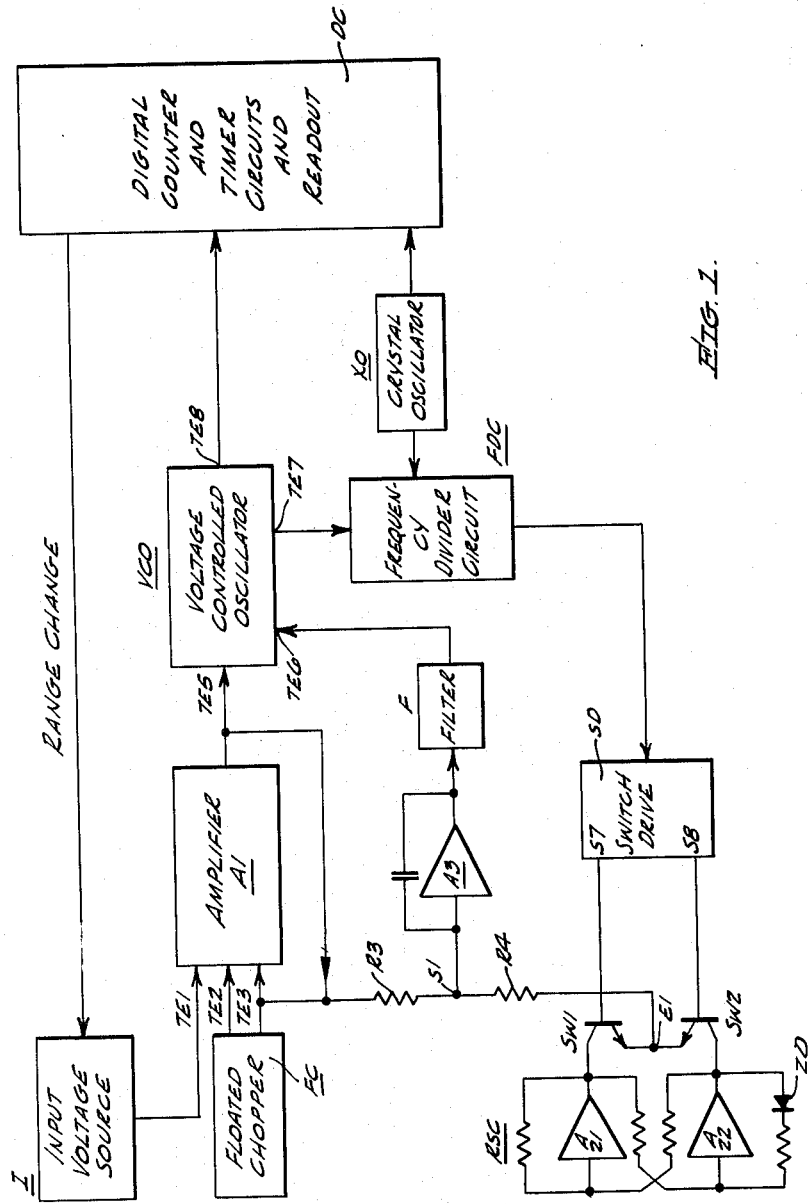
FIG. 1 is a block diagram illustrating a presently preferred embodiment of this invention.

In FIG. 1 the converter includes a converter circuit means comprising a conventional voltage controlled oscillator, generally designated VCO. While any suitable type of oscillator for receiving an input voltage and converting such input voltage to a frequency having a predetermined relationship to the input voltage may be employed herein, one particular type which is usable is illustrated in FIG. 4 in the copending application of Joe E. Deavenport et al., identified hereinabove. The converter circuit means includes additionally an input circuit means herein represented as a chopper stabilized potentiometric amplifier, generally designated A1, having a plurality of input terminals TE1, TE2 and TE3 respectively receiving an input voltage to be measured from an input voltage source generally designated I and the output of a floated chopper FC which is applied to the terminals TE2 and TE3. The output of the input circuit means is coupled to terminal TE5 of the voltage controlled oscillator VCO. A circuit of the type suitable for amplifier A1 would have an open loop gain of 100 db or more depending on the desired accuracy, linearity and general performance desired. A feedback loop is coupled between the output of the amplifier A1 and the input terminal TE3 to complete the potentiometric amplifier. The details of the input circuit means are illustrated in FIGS. 2 and 3 in the copending application aforesaid and is not described in detail at this point.

The output of the voltage controlled oscillator VCO is at output terminals TE7 and TE8. Output terminal TE8 may be coupled as input to any suitable digital counter capable of receiving the electrical output of the oscillator. Under the control of timing circuits coupled to and driven by a fixed frequency oscillator, such as a crystal oscillator, generally designated XO, the digital counter circuits produce a quantized indication of the magnitude and sign of the input voltage. To accommodate electrical inputs which are beyond the range of the digital counter circuits or the circuits of the input amplifier A1 provision may be made by means of a range changing circuit coupled from the digital counter DC to switching impedance networks (not shown) in the input voltage source I to properly scale the input voltage to the amplifier means A1. The details of such circuits are also covered in the copending application of Deavenport et al. aforesaid and are not duplicated herein in the interest of simplicity.

The voltage controlled oscillator also comprises a correction signal input circuit having an input terminal TE6 which is controlled by the output of a control or correction signal circuit comprising an amplifier A3 and a filter F, the latter if needed. As will be seen by reference to FIG. 4 of said copending application, the input signal circuit of the amplifier A3 is coupled to the output terminal tive input terminals TE5 and TE6, each comprise a series summing resistor coupled to a common output terminal or summing junction in the base circuit of transistor Q32. Conventionally, this circuit produces an output potential at the summing junction which is the algebraic sum of the input and correction currents applied at terminals TE5 and TE6, respectively. The input circuit of the amplifier A3 is coupled to th output terminal S1 of a summing network comprising a pair of resistors R3 and R4. The resistor R3 is coupled to and energized by the output of the amplifier means A1 which output, it will be noted, is also coupled to the input terminal TE5 at the input circuit of the voltage controlled oscillator. The resistor R4 is coupled to the output terminal E1 of a reference voltage switching circuit RSC, forming part of a feedback circuit, and comprising a pair of switching transistors SW1 and SW2 of the n-p-n variety having common emitter circuits coupled to the terminal E1 and having respective collector circuits coupled to the outputs of respective amplifiers A21 and A22 constituting positive and negative reference voltage networks. Any suitable constant D.C. precision reference voltage supply may be substituted for that shown.

In the circuit arrangement as thus far described, when the transistor switch SW1 is conducting a positive reference voltage is coupled to the terminal E1. When the transistor switch SW2 is conducting a negative reference voltage is coupled to the terminal E1.

Transistor switches SW1 and SW2 are controlled by a switch drive, generally designated SD, having a pair of output terminals S7 and S8 providing complementary output voltages which, according to one embodiment of this invention, switch between positive and negative potentials in the two voltages states of each of the output terminals of sufficient magnitude. Thus, when the terminal S7 is in the higher (positive potential) of its two voltage stages an enabling voltage is applied to the base of the transistor switch SW1 causing this transistor to conduct to couple current from the positive reference voltage supply to the resistor R4. At the time the terminal S7 is at some predetermined positive potential the terminal S8 is at some predetermined negative potential and the transistor switch SW2 is cut off. When the terminal S8 switches to the higher (positive) of its two voltage states the terminal S7 switches to the lower (negative) of its two voltage states cutting off transistor switch SW1 and switching transistor switch SW2 to conduction so that current from the negative reference voltage supply is coupled to the resistor R4.

Control of the switch drive SD in the feedback circuit is provided by means of a frequency divider circuit, generally designated FDC, which is under the control of the electrical output of the voltage controlled oscillator VCO, appearing at the output terminal TE7, and the electrical output of a fixed frequency oscillator, here identified as a crystal oscillator, generally designated XO. The electrical output of the frequency divider circuit FDC which is coupled as input to the flip-flop switch drive FSD switches the switch drive FSD between its two stable states in time intervals of relative duration determined by the frequency of the voltage controlled oscillator in relation to the frequency of the crystal oscillator. In the embodiment of this invention illustrated herein the crystal oscillator provides a fixed time interval of lesser duration than the shortest time interval provided by the output of the voltage controlled oscillator when operating at its highest frequency. Further in accordance with the illustrated embodiment of this invention, the crystal oscillator determines the length of time that the transistor switch SW1 coupling current from the positive reference voltage source into the summing network will be conducting, and the voltage controlled oscillator which determines the total time period (for a particular frequency of the voltage controlled oscillator) thus determines the length of time the transistor switch SW2 will be conducting to couple current from the negative voltage source into the resistor R4 of the summing network. Thus, an average D.C. voltage or current of relatively positive or negative polarity, depending upon the relationship of the fixed period of switching to the variable period of switching, is coupled to the resistor R4 to provide a correction voltage or current in the input of amplifier A3 of a magnitude and sense required to bring the output frequency of the voltage controlled oscillator precisely to that value indicative of the input voltage. The algebraic sum of the voltages in the summing circuit is integrated by the amplifier A3 and filtered prior to coupling to the correction signal input circuit TE6 of the voltage controlled oscillator.

The organizational details of the frequency divider circuit FDC and the switch drive SD are illustrated in FIG. 2 and the details of the flip-flop switch drive FSD and the output switch OS comprising the switch drive SD are shown in FIGS. 3 and 4, respectively. As will be seen from FIG. 2, individual frequency dividers FD1 and FD2, respectively, which may each be of the cascaded flip-flop variety, are coupled to the outputs of the voltage controlled oscillator VCO and the crystal oscillator XO. In the latter case coupling is achieved through an "and" gate, generally designated AG, which may be of the type as typically illustrated in FIG. 3 of Patent 2,803,401, the other input terminal of which is coupled to the output terminal S5 of the flip-flop switch drive FSD for a purpose yet to be described. As earlier noted herein, the output of the crystal oscillator XO is instrumental in providing a fixed time interval for switching of the switch drive SD which is shorter than the shortest time interval established by the voltage controlled oscillator when the voltage controlled oscillator is operating at its highest frequency. To this end the frequency of the crystal oscillator and the frequency division provided by the frequency divider FD2 is such as to provide a switching signal at an input terminal J3 of the flip-flop switch drive FSD to effect a switching operation within the switching interval provided by the output of the frequency divider FD1, coupled to a terminal K2 of the flip-flop switch drive FSD, for the highest frequency of the voltage controlled oscillator VCO.

This switching operation will be better understood by particular reference to FIG. 3 showing a representative type of flip-flop switch drive FSD, it being understood that other equivalent circuits may be employed in place of that illustrated herein. The circuit of FIG. 3 comprises a conventional transistor type of flip-flop including respective p-n-p transistors TQ1 and TQ2 having grounded emitters. The collector circuits are coupled through respective resistors R5 and R6, usually of equal ohmic value, to a suitable supply of negative potential herein designated —V. The cross-coupling networks cross coupling the collector circuits to opposite bases, respectively, each conventionally include a resistor and a capacitor, as shown. Terminals S5 and S6, which are the output terminals identified in the several figures, are coupled between the collectors and the respetcive resistors R5 and R6 and are switched between ground potential, when the transistors are conducting, and some lower potential, when the transistors are not conducting. When one transistor is on, the other transistor is off. The base circuits of the transistors are coupled through resistors R7 and R8, of equal ohmic value, to a suitable supply of positive voltage designated +V. The base circuit of the transistor TQ2 is further controlled by voltages at the terminals J3 and J4 which are respectively coupled through a capacitor C9 and a resistor R9 to the anode of a coupling diode D1, the cathode of which is coupled to the base of the transistor TQ2. The terminal J4 is additionally coupled to the output terminal S5 which provides a steering voltage or an enabling voltage thereon for a purpose yet to be described. Terminals K1 and K2 are respectively coupled by means of a capacitor C10 and a resistor R10 to the anode of a coupling diode D2, the cathode of which is coupled to the base of the transistor TQ1.

From the description made to this point this flip-flop will be recognized as a J-K type of flip-flop in which the flip-flop is caused to switch from one stable state to the other by the application of input voltage to the respective J and K input terminals, this circuit having minor variations from the conventional type in the provision of the enabling circuits coupled to the respective terminals J4 and K2. The flip-flop is switched by the coupling of a positive going voltage pulse to one of the two base circuits. If, for instance, the transistor TQ2 is conducting, the collector circuit thereof will be coupled approximately to ground potential which couples ground potential to the terminal J4. When the terminal J4 is in this higher of its two voltage states the coupling of a positive going voltage pulse to the terminal J3 results in a voltage pulse which is superimposed on the voltage state signal in the base circuit of the transistor TQ2. This drives the base above ground or cutoff potential. The cross-coupling action provided by the cross-coupling networks results in the initiation of conduction of the transistor TQ1 as transistor TQ2 cuts off. The collector circuit of transistor TQ1 is now coupled approximately to ground potential, while the collector of transistor TQ2 is at some negative potential.

As will be seen by reference to FIG. 2, the terminal K2 is coupled to the output of the frequency divider FD1. Thus, at any time that the output of the frequency divider FD1 goes positive an enabling voltage is coupled to the base circuit of the transistor TQ1. Switching is prevented by the damping action of the resistor R10. Again, with reference to FIG. 2, it will be noted that the output of the crystal oscillator is also directly coupled to the terminal K1 of the flip-flop switch drive. Thus, after enabling of the base circuit of the transistor TQ1 a positive going signal from the crystal oscillator XO results in coupling to the base of transistor TQ1 of a positive going pulse superimposed on approximately ground potential which drives this base above the emitter potential cutting off this transistor. Switching in the reverse direction now takes place with terminal S6 dropping in potential and terminal S5 switching approximately to ground potential at the time the transistor TQ2 switches to conduction. In further reference to FIG. 2 it will be noted that the terminal S5, in addition to being coupled to the terminal J4 of the flip-flop switch drive, is also coupled to the "and" gate AG and in the higher of its two voltage states, that is, ground potential, operates as an enabling voltage on this "and" gate so that the output of the crystal oscillator may be coupled as input to the frequency divider FD2, thus synchronizing the timing cycles provided by the respective oscillator and frequency divider circuits.

The output terminals S5 and S6 of the flip-flop switch drive FSD are coupled respectively to input terminals I7 and I8 of the output switch OS. As will be described hereinbelow, the output switch OS is a transistor type of switch producing output voltage state signals in response to input signals selectively at its terminal I7 and I8 of a magnitude sufficient to switch the switching transistors SW1 and SW2. To this end the terminals S7 and S8 which are the output terminals of the transistor switch OS are coupled to the respective bases of the transistor switch SW1 and SW2.

As will be seen by reference to FIG. 4 the output switch OS comprises a pair of series connected transistor circuits. These circuits are connected between +15 volts and —15 volts as indicated. The first such circuit comprises a resistor R13 having one terminal connected to the +15-volt supply circuit and having the other terminal connected to the emitter of a transistor TQ3 which is of the p-n-p variety. The collector of transistor TQ3 is connected to the collector circuit to the collector of a transistor TQ5, the emitter of which is connected directly to the —15-volt supply circuit as shown. Transistor TQ5 is an n-p-n type transistor. The other series connected transistor circuit comprises a resistor R14 connected between the emitter of a transistor TQ4 and a +15-volt supply circuit. Transistor TQ4 is a p-n-p type of transistor and has its collector circuit connected to the collector circuit of a transistor TQ6 of the p-n-p variety. The emitter circuit of transistor TQ6 is connected to the —15-volt circuit as shown. The bases of transistors TQ3 and TQ4 are biased in voltage divider circuits comprising respective resistors R12 and R16 in series for the transistors TQ3 and R15 and R17 in series for the transistor TQ4. The first named voltage divider circuit is connected between +15 volts and ground and the second voltage divider circuit is similarly connected between +15 volts and ground. The base biases on the transistors TQ3 and TQ4 are such as to drive these transistors through conduction. A biasing resistor R19 connects the base of the transistor TQ6 to —15 volts as indicated. A resistor R21 and a capacitor C21 in series are also connected to the base of the transistor TQ6. This circuit which terminates in an input terminal I7 is adapted to receive triggering voltage to switch the transistor TQ6 between nonconducting and conducting conditions as will be described. A similar base biasing circuit is provided for the transistor TQ5 wherein a resistor R18 is coupled between its —15 volts and the base thereof. Additionally, the series connected capacitors C20 and resistor R20 are coupled to the base of the transistor TQ5. Input terminal I8 couples to the capacitor to provide an input signal connection. As indicated in FIG. 4 the terminals S7 and S8 couple to the respective common collector circuits of the series connected transistors. These terminals as shown connect the respective bases of the transistor switches SW1 and SW2 to the collector circuits to be controlled thereby.

The base biases on the transistors TQ5 and TQ6 provided by the biasing resistors R18 and R19 is such as to normally maintain these transistors cut off. The transistors are selectively switched to conducting condition by input voltages coupled to the terminals I7 and I8, respectively. As will be noted from FIG. 2 these voltages are derived from terminals S5 and S6. These are voltage state signals and they are complementary voltages. Thus, when the voltage coupled to the terminal I7 is high, for instance, the voltage which is coupled to the terminal I8 will be at its lowermost potential. The time constants of the circuits coupled to the bases of the respective transistors TQ5 and TQ6 is sufficiently long as to provide continuous coupling of the voltage state signals from terminals S5 and S6 into the base circuits for the longest period of duration of either of the voltage state signals. Thus, the flip-flop switch drive FSD drives the output switch OS so that its output terminals S7 and S8 switch between positive and negative voltage states, respectively, providing complementary output voltages swinging between voltage levels of a magnitude suitable for switching the transistor switches SW1 and SW2.

Assuming that the output terminal S5 has switched high and the output terminal S6 has switched low, it will be seen that positive going voltage coupled through the terminal I7 is applied to the base circuit of the transistor TQ6 through the resistor and capacitor R21 and C21, respectively. This positive going base voltage drives the transistor TQ6 to conduction coupling its collector circuit approximately to −15 volts as shown. Thus, the terminal S8 is at approximately −15 volts. Since the transistor TQ3 is also conducting its collector circuit is coupled to a positive voltage approaching +15 volts and determined by the IR drop across the resistor R13. The positive voltage on the base circuit of the transistor switch SW1 causes this transistor to conduct. The negative voltage on the base of the transistor switch SW2 maintains this transistor cut off. Whenever the output of the flip-flop switch FSD switches so that the output terminal S6 goes to the higher of its two voltage states while the output of the terminal S5 goes to the lower of its two voltage states the condition just described is reversed, the transistor TQ5 conducting and the transistor TQ6 being cut off.

The operation of this system will be better understood by reference to the timing diagram of FIG. 5 showing the timing of several signals in the circuit in achieving operation of the type described. It is to be understood that all of the signals illustrated thereon are idealized in rectangular wave configuration. No attempt has been made to indicate particular magnitudes of the signals and in this respect the signals are not to be considered as drawn to scale. For want of space the wave forms depicting the respective signals in relation to time are not continuous so that the relationships of only certain critical portions of the wave forms have been set forth. The uppermost signal graphically depicts the output of the crystal oscillator XO as a rectangular wave voltage. The output of the frequency divider FD1 is depicted as a rectangular wave voltage switching at some random interval of time from a negative voltage to ground potential, and at some later point in time, depending upon the organization of the frequency divider and of a period involving at least one and preferably several cycles of the crystal oscillator, is then switched back to negative potential. When the electrical output of the frequency divider FD1 has switched to the higher of its two voltage states, providing an enabling voltage on the terminal K2 of the flip-flop switch drive FSD, the next succeeding positive going output of the crystal oscillator XO coupled to the terminal K1 of the flip-flop swich drive FSD couples a positive going voltage to the base of the transistor TQ1 switching off this transistor if it had been conducting. Thus, the electrical output of the terminal S6 drops from approximately ground potential to some negative potential, while at the same time the electrical output of the terminal S5 switches from a negative potential to approximately ground potential, as illustrated in FIG. 5.

The rise in potential of the terminal S5, by reason of its coupling to terminal J4 and to the "and" gate AG, now enables the J side of the flip-flop switch drive FSD and the "and" gate AG. The next positive going excursion of the output of the crystal oscillator XO is gated to the input of the frequency divider FD2 which now begins its count cycle. This frequency divider is in that electrical configuration in which the most significant flip-flop is in its "1" representing electrical state, in which it remained from its last cycle, and the others are in their "0" representing electrical states, as will be seen hereinafter. Midway in the counting cycle all of the flip-flops are in their "1" representing electrical states and on the next cycle of the crystal oscillator switch to their "0" representing electrical states. This is the point at which the wave form depicting the output of frequency divider FD2 switches from zero volts 0 v., to a predetermined negative voltage, −v., as shown. The counting cycle now continues until the most significant flip-flop switches to its "1" representing electrical state which is the point at which the output of the frequency divider FD2 swings in a positive direction. This is depicted in FIG. 5. At this point, since the terminal J4 is energized, the transistor TQ2 is cut off and the terminal S5 drops to the lower of its two voltage states which disables the voltage state terminal J4 and the "and" gate AG, leaving the counter in this last-named configuration. Thus, the voltage states of the output terminals S5 and S6 of the flip-flop switch drive FSD have been reversed during a particular fixed period of time determined by the crystal oscillator frequency and the frequency divider FD2. This period is the same during each cycle of the operation. The voltages at terminals S7 and S8 of the output switch OS switch between their upper and lower voltage levels synchronously with the voltages at terminals S5 and S6, respectively, as shown.

The frequency divider FD2, having switched from the higher of its two voltage states to the lower of its two voltage states after a predetermined period of time, as shown, now remains in this voltage state throughout the remainder of the count cycle of the frequency divider FD. Since the frequency division is a fixed value, the time interval varies in direct proportion to the frequency of the voltage controlled oscillator and will be longest for the lowest frequency of the oscillator and shortest for the highest frequency of the voltage controlled oscillator, but in any event will always be longer than the fixed time interval provided by the crystal oscillator XO and the frequency divider FD2, as illustrated in FIG. 5. With the next positive going excursion of the output of the frequency divider FD1 the cycle is restarted as described hereinabove and continues at a rate determined by the frequency of the voltage controlled oscillator. The output voltage of the terminal E1, controlled by the transistor switches SW1 and SW2, the collectors of which may be coupled to any constant positive voltage and negative voltage supply circuit, respectively, is depicted in FIG. 5. As will be seen from FIG. 5, when the terminal S5 is switched in the positive direction terminal S8 switches low and the terminal S7 switches high and transistor SW1 conducts, coupling the +10-volt supply to the terminal E1 supplying current from this source to the resistor R4. This characteristic is illustrated showing the positive going wave front of the voltage at terminal E1. Whenever the terminal S5 switches negative and the terminal S6 switches positive, terminals S7 and S8 are switched negative and positive, respectively. Transistor switch SW1 is cut off and transistor switch SW2 conducts, the latter now coupling −10 volts to the terminal E1 supplying current to the summing resistor R4 from the negative voltage source. This is indicated by the negative going voltage excursion coincident with the switching of the voltages at the terminals S7 and S8 as illustrated. The negative voltage source remains coupled to the summing network until the voltage controlled oscillator drives the frequency divider FD1 until the output flip-flop thereof switches high to start the cycle over again.

From these discussions it will be seen that the crystal oscillator and the frequency divider FD2 are instrumental in establishing a predetermined time interval $t1$ which is fixed and that the voltage controlled oscillator VCO and the frequency divider FD1 are instrumental in establishing an overall time period $t2$ between positive going wave fronts of the voltage at the terminal E1, leaving a residual varying time period $t3$ which results from subtracting $t1$ from $t2$. For the convention adopted herein the fixed time interval $t1$ determines the duration of the positive voltage in each cycle of operation and the variable period $t3$ determines the period of application of the negative reference voltage. These conditions may be reversed depending upon the requirements of the system. Note will also be made of the fact that the positive going excursions of the output of the frequency divider FD1 may not always fall at precisely the same point on a cycle of output of the crystal oscillator XO. For instance, as illustrated in FIG. 5, the first positive going excursion of the output of the frequency divider FD1 occurs just after a positive going excursion of the output of the crystal oscillator. The second positive going excursion of the output of the frequency divider FD1 occurs just prior to a positive going excursion of the output of the crystal oscillator. Thus, switching of the flip-flop switch drive FSD always takes place within one cycle of the output of the crystal oscillator, as will be seen from the remainder of the wave forms illustrated.

The frequency divider may comprise conventional cascaded flip-flops, such as the J-K variety of flip-flop described herein, to provide conventional binary counting. In addition to switching operations resulting from selective application of triggering pulses to the J and K inputs these flip-flops may be switched from one state to the other by the application of simultaneous pulses. The application of Deavenport et al. aforesaid discusses several types of cascaded counters for providing frequency division. One of these is the counter RCO in FIG. 1 therein, and another is the timing counter TC, also in FIG. 1 therein, and shown in greater detail in FIG. 11 therein. The straight cascaded flip-flop counter having a single output flip-flop switching between two voltage states during the counting cycle, as shown in FIG. 5, is suitable for the frequency divider FD2. In the case of frequency divider FD1 output circuits providing return of the output flip-flop to the lower of its two voltage states in a period of time permitting several cycles of the output of the crystal oscillator to occur is desirable to prevent the flip-flop switch drive FSD from being switched back to that condition in which the terminal S5 is high on the cycle of the crystal oscillator following that which switched the flip-flop switch drive to that condition in which the terminal S6 was high. Arrangements for achieving this sort of switching by intercoupling two or more of the most significant flip-flops are discussed in connection with the frequency divider RCO of FIG. 1, as particularly illustrated in FIGS. 7 and 8, of the application of Deavenport et al. aforesaid.

In one practical embodiment of this invention a crystal oscillator is provided which operates at a frequency of 286.72 kc., the output of which is divided or counted down by a 192 count frequency divider FD2. The voltage controlled oscillator is set to operate at 400 kc. for zero volts input and to provide a 200 kc. deviation per volt of excursion of the input voltage in positive and negative directions, respectively. In one embodiment the application of +1 volt at the input terminal of the voltage controlled oscillator reduces the frequency from 400 kc. to 200 kc. and the application of −1 volt to the input thereof increases the frequency from 400 kc. to 600 kc. Frequency divider FD1 requires 512 counts per cycle. From this the following values for period, pulse width and duty cycle may be derived:

$$\text{Period}_0 = \frac{512}{400} \text{ MS}$$

$$\text{Period}_+ = \frac{512}{200} \text{ MS}$$

$$\text{Period}_- = \frac{512}{600} \text{ MS}$$

$$\text{Pulse width} = \frac{192}{286.72} \text{ MS} = \text{constant}$$

$$\text{Duty cycle} = \frac{\text{pulse width}}{\text{period}}$$

$$\text{Duty cycle}_0 = \frac{192(400)}{286.72(512)} = 52.4\%$$

$$\text{Duty cycle}_+ = \frac{192(200)}{286.72(512)} = 26.2\%$$

$$\text{Duty cycle}_- = \frac{192(600)}{286.72(512)} = 78.6\%$$

Several important advantages are derived from the arrangements disclosed hereinabove. The elimination of capacitors as part of the primary conversion system minimizes stray coupling in the system and thus reduces intermodulation of noise while at the same time reducing the rigorous performance requirement of components. Additionally, the problem of temperature sensitivity inherent in capacitors is minimized and, likewise, radio frequency interference is minimized. By eliminating capacitors in the major conversion system there is no frequency limit on the conversion equipment excepting that imposed by component limitations, i.e., switching rates, response rates of readout devices, etc. Thus, it is conceivable that no less than 4 mc. as an upper frequency limitation may be realized in a digital voltmeter application having 5 digits in the readout stage.

Although but one embodiment of this invention has been illustrated herein, it will be appreciated by those skilled in the art that changes may be made, both in the organizational aspects as well as the details of this invention, without departing from the spirit and scope thereof.

For instance, instead of using the crystal oscillator XO and the frequency divider FD2 to produce a fixed time period of shorter duration than the shortest variable time period produced by the frequency divider FD1 and the voltage controlled oscillator VCO, the fixed time period may be increased to be greater than the variable period simply by changing the frequency dividers or the oscillator frequencies, or both, as required. With this latter arrangement voltage-to-time conversion is achieved. Further, other types of oscillators, amplifiers, frequency dividers, switches and circuit components may be substituted for those illustrated and described herein without departing from the spirit and scope of this invention. Accordingly, it is intended that the foregoing disclosure and the showings in the drawings shall be construed only as illustrative of the principles of this invention and not construed in a limiting sense.

What is claimed is:
1. A converter circuit comprising:
  converter circuit means having input signal circuit means, having a correction signal input circuit, and having an output signal circuit, for receiving an input signal and producing an electrical output signal differing from said input signal;
  control means having an input circuit coupled to said input signal circuit means and having an output circuit coupled to said correction signal input circuit;
  a reference voltage circuit;

a switching circuit coupling said reference voltage circuit to said input circuit of said control means;

and circuit means including a digital counter, coupled to and controlled by said output signal circuit of said converter circuit means and having an output circuit coupled to said switching circuit for producing discrete switching signals having a frequency depending upon said output signal for controlling said switching circuit.

2. A converter circuit comprising:

converter circuit means having input signal circuit means, having a correction signal input circuit, and having an output signal circuit, for receiving an input signal and producing an electrical output signal differing from said input signal;

control means having an input circuit coupled to said input signal circuit means and having an output circuit coupled to said correction signal input circuit;

a reference voltage circuit having a positive voltage output circuit and a negative voltage output circuit;

a pair of switches having respective input circuits coupled to said positive voltage and negative voltage circuits, respectively, and having respective output circuits coupled to said input circuit of said control means;

and circuit means including a digital counter, coupled to said output signal circuit of said converter circuit means to be controlled thereby and having output circuit means coupled to both of said switches for producing discrete switching signals at a rate depending upon said output signal for controlling said switches.

3. A converter circuit comprising:

converter circuit means having input signal circuit means, having a correction signal input circuit, and having an output signal circuit for receiving an input signal and producing an electrical output signal differing from said input signal;

control means having an input circuit coupled to said input signal circuit means and having an output circuit coupled to said correction signal input circuit;

a reference voltage circuit having a positive voltage output circuit and a negative voltage output circuit;

a pair of switches having respective input circuits coupled to said positive voltage and negative voltage circuits, respectively, and having commonly coupled output circuits coupled to said input circuit of said control means;

first timing means for producing fixed interval timing signals describing a fixed period of time;

second timing means coupled to said output signal circuit of said converter circuit means for producing variable interval timing signals in dependence upon the electrical output of said converter circuit means;

and a switching circuit having a first input circuit coupled to and controlled by said first timing means, having a second input circuit coupled to and controlled by said second timing means, and having respective output circuits coupled to and controlling said switches.

4. Apparatus as set forth in claim 3 in which said switching circuit means comprises a flip-flop having two input circuits and two output circuits.

5. Apparatus as set forth in claim 3 in which said first timing means comprises a fixed frequency oscillator and a frequency divider coupled to and controlled by said fixed frequency oscillator.

6. Apparatus as set forth in claim 3 in which said second timing means comprises a frequency divider.

7. Apparatus as set forth in claim 3 in which the fixed interval of time between successive fixed interval timing signals of said first timing means is always less than the interval of time between successive variable interval timing signals of said second timing means.

8. Apparatus as set forth in claim 3 in which the fixed interval of time between successive fixed interval timing signals of said first timing means is always greater than the interval of time between successive variable interval timing signals of said second timing means.

9. A converter circuit comprising:

converter circuit means having input signal circuit means, having a correction signal input circuit, and having an output signal circuit, for receiving an input signal and producing an electrical output signal differing from said input signal;

control means having an input circuit coupled to said input signal circuit means and having an output circuit coupled to said correction signal input circuit;

a reference voltage circuit having a positive voltage output circuit and a negative voltage output circuit;

a pair of switches having respective input circuits coupled to said positive voltage and negative voltage circuits, respectively, and having commonly coupled output circuits coupled to said input circuit of said control means;

first timing means for producing fixed interval timing signals describing a fixed period of time and including a fixed frequency oscillator, a frequency divider and a two input gate coupling said fixed frequency oscillator to said frequency divider;

second timing means coupled to said output signal circuit of said converter circuit means for producing variable interval timing signals in dependence upon the electrical output of said converter circuit means;

a switching circuit having a first input circuit coupled to and controlled by said first timing means, having a second input circuit coupled to and controlled by said fixed frequency oscillator, having respective output circuits coupled to and controlling said switches, having a first enabling input circuit coupled to and controlled by one of said respective output circuits and having a second enabling input circuit coupled to and controlled by said second timing means;

and circuit means connecting one of said respective output circuits of said switching circuit to said gate to enable said gate when the voltage of said one of said respective output circuits at a predetermined level.

References Cited by the Examiner

UNITED STATES PATENTS

| | | | |
|---|---|---|---|
| 2,840,806 | 6/1958 | Bateman | 340—347 |
| 2,872,670 | 2/1959 | Dickinson | 340—347 |
| 2,941,196 | 6/1960 | Raynsford et al. | 340—347 |
| 2,994,825 | 8/1961 | Anderson | 332—9 X |
| 3,112,410 | 11/1963 | Schmid | 307—88.5 |
| 3,127,601 | 3/1964 | Kaenel | 340—347 |

OTHER REFERENCES

Grabbe et al.: Handbook of Automation, Computation and Control, vol. 1, Wiley & Sons, 1958, pp. 23–54 and 23–55.

ARTHUR GAUSS, *Primary Examiner.*

I. C. EDELL, *Assistant Examiner.*